US008620925B1

(12) United States Patent
Grube et al.

(10) Patent No.: US 8,620,925 B1
(45) Date of Patent: Dec. 31, 2013

(54) SYSTEM AND METHOD FOR IDENTIFYING ADVERTISING OPPORTUNITIES

(75) Inventors: Nils Grube, Hamburg (DE); Johann-Caspar Isemer, Hamburg (DE); Eriel Thomas, Kirkland, WA (US); Angela Krieger, Hamburg (DE); Reemda Anna Tieben, Hamburg (DE); Tobias Kugler, Hamburg (DE); Jannika Christine Bock, Hamburg (DE)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 13/473,705

(22) Filed: May 17, 2012

(51) Int. Cl.
G06F 17/30 (2006.01)
(52) U.S. Cl.
USPC .......................... 707/741; 707/748; 707/758
(58) Field of Classification Search
USPC ......................... 707/741, 748, 758
See application file for complete search history.

(56) References Cited

U.S. PATENT DOCUMENTS 7,240,049 B2    7/2007  Kapur
8,209,344 B2 *  6/2012  Ramer et al. ................. 707/758
2007/0100804 A1    5/2007  Cava
2009/0030780 A1 *  1/2009  York et al. ....................... 705/10
2009/0198511 A1 *  8/2009  Boehlke ............................ 705/2
2011/0040733 A1    2/2011  Sercinoglu et al.
2011/0179017 A1    7/2011  Meyers et al.
2012/0030018 A1    2/2012  Passmore et al.

\* cited by examiner

*Primary Examiner* — Baoquoc N To
*Assistant Examiner* — Andalib Lodhi
(74) *Attorney, Agent, or Firm* — Leason Ellis LLP

(57) ABSTRACT

This specification describes technologies relating to content presentation. In general, one aspect of the subject matter described in this specification can be embodied in methods that include the actions of processing quantities of query instances to calculate (a) a volume differential between the quantities, (b) a percentage differential between the quantities, and (c) a volume differential between the impressions per query instance values, computing a first opportunity index that includes a product of: (a) an absolute value of the volume differential between the quantities, and (b) the percentage differential between the quantities, computing a second opportunity index including a product of: an absolute value of the first opportunity index, the volume differential between the impressions per query instance values, and the impressions per query instance values, and providing campaign improvement suggestions to an advertiser based on the second opportunity index. Other embodiments include corresponding systems, apparatus, and computer program products.

19 Claims, 8 Drawing Sheets

FIG. 3A

Geographies:

Tonga
Trinidad and Tobago
Tunisia
Turkey
Turkmenistan
Turks and Caicos Islands
Tuvalu
Uganda
Ukraine
United Arab Emirates
United Kingdom
United States
United States Minor Outlying Islands
Uruguay
Uzbekistan

*Please select one country or multiple countries*

Categories:

/Computers & Consumer Electronics/Consumer Electronics/Home Audio & Video/Televisions/Plasma TVs
/Computers & Consumer Electronics/Consumer Electronics/Home Audio & Video/VCRs
/Computers & Consumer Electronics/Consumer Electronics/Portable Media Devices
/Computers & Consumer Electronics/Consumer Electronics/Portable Media Devices/Digital Book Readers
/Computers & Consumer Electronics/Consumer Electronics/Portable Media Devices/MP3 Player Accessories
/Computers & Consumer Electronics/Consumer Electronics/Portable Media Devices/Portable CD Players
/Computers & Consumer Electronics/Consumer Electronics/Portable Media Devices/Portable DVD Players
/Computers & Consumer Electronics/Consumer Electronics/Portable Media Devices/Portable Stereos & Boomboxes
/Computers & Consumer Electronics/Consumer Electronics/Radar Detectors
/Computers & Consumer Electronics/Consumer Electronics/Wireless Devices
/Computers & Consumer Electronics/Consumer Electronics/Wireless Devices/Bluetooth Wireless Accessories & Devices
/Computers & Consumer Electronics/Consumer Electronics/Wireless Devices/PDAs
/Computers & Consumer Electronics/Consumer Electronics/Wireless Devices/Walkie-Talkies
/Dining & Nightlife

*Please select one category or multiple categories*

The following queries showed significant increases over the last month in both the number of queries received and the number of ad impressions per query. You should consider bidding on these 'trending' queries:

'smartphone'

'tablet'

FIG. 3D

| Query | Old Count | New Count | Delta Query Growth | Percent Query Growth | Is New Query | Old IPQ | New IPQ | Delta IPQ Growth | Percent IPQ Growth | Query Opportunity Index | Commercial Opportunity Index | IPQ Impact Index |
|---|---|---|---|---|---|---|---|---|---|---|---|---|
| smartphone | 445 | 931432 | 930987 | 2092.1056 | no | 0.04 | 0.89 | 0.85 | 22.2154 | 19477231132.96 | 1466008905.57 | 790487.2 |
| MP3 Player | 18 | 61006 | 60988 | 3388.2222 | no | 4.44 | 2.49 | -1.95 | -0.4395 | 20664899.89 | -10055280010.54 | -119175.78 |
| tablet | 25 | 50870 | 50845 | 2033.8 | no | 6.6 | 10.01 | 3.41 | 0.5168 | 10340856.1 | 3531185024.88 | 173519 |

SYSTEM AND METHOD FOR IDENTIFYING ADVERTISING OPPORTUNITIES

BACKGROUND

This specification relates to content presentation.

The Internet provides access to a wide variety of resources. For example, video and/or audio files, as well as web pages for particular subjects or particular news articles, are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements ("ads"). In turn, an auction can be performed and the advertisement slots can be allocated to advertisers according, among other things, to their bids and/or the relevance of the advertisement to content presented on a page hosting the slot or a request that is received for the advertisement.

SUMMARY

This specification describes technologies relating to content presentation.

In general, one aspect of the subject matter described in this specification can be embodied in methods for identifying advertising opportunities. The method includes the actions of processing a quantity of query instances received during a first time period and a quantity of query instances received during a second time period, each of the first and second quantities of query instances having a respective impressions per query instance value, to calculate (a) a volume differential between the respective quantities of query instances, (b) a percentage differential between the respective quantities of query instances, and (c) a volume differential between the respective impressions per query instance values, each of the query instances received during the first time period and the query instances received during the second time period corresponding to a specific search query, computing, with a processor executing code, a first opportunity index, the first opportunity index including a product of: (a) an absolute value of the volume differential between the respective quantities of query instances, and (b) the percentage differential between the respective quantities of query instances, computing a second opportunity index, the second opportunity index including a product of: an absolute value of the first opportunity index, the volume differential between the respective impressions per query instance values, and at least one of the impressions per query instance values, and providing one or more campaign improvement suggestions to an advertiser based on the second opportunity index.

The details of one or more implementations are set forth in the accompanying drawings and the description below. Other features and advantages will be apparent from the description and drawings, and from the claims.

BRIEF DESCRIPTION OF THE DRAWINGS

FIG. 3A is an example user interface where an advertiser can select a first time period and a second time period.

FIG. 3B is an example user interface where an advertiser can select one or more countries or regions.

FIG. 3C is an example user interface where an advertiser can select one or more categories.

FIG. 3D is a screenshot depicting an example campaign improvement suggestion.

FIG. 4 is an example interface showing various metrics and values relating to several different queries.

Like reference symbols in the various drawings indicate like elements.

DETAILED DESCRIPTION

By way of overview and introduction, an advertiser interested in advertising within the context of search results pages (i.e., pages of Internet search results provided to a user in response to a search engine query) must identify the specific search query or queries for which the advertiser wishes that his/her ads will appear. While some queries are searched on a relatively frequent basis, other queries are more seasonal in nature (e.g., the query 'turkey' around the holiday of Thanksgiving), and yet other queries may have never been searched before (e.g., the name of a newly released product). With respect to such seasonal and/or newly appearing queries, it is advantageous for an advertiser to be able to identify changes or increases in search and/or advertising trends as soon as possible, in order to enable the advertiser to capitalize on the referenced changes.

In some implementations, various values and metrics associated with a particular search query over the course of two consecutive time periods can be compared in order to compute certain values that reflect changes or trends across the two time periods with respect to both search and advertising behaviors. These values can then be further processed to compute a number of opportunity indexes that can be used to compare various queries with one another and which reflect various aspects of the opportunities available to the advertiser with respect to the query. Such opportunity indexes can then be used to provide one or more campaign improvement suggestions to the advertiser.

While reference will be made below to advertising systems and processes, other forms of content including other forms of sponsored content can be managed and presented in accordance with the description below.

Figure 1:
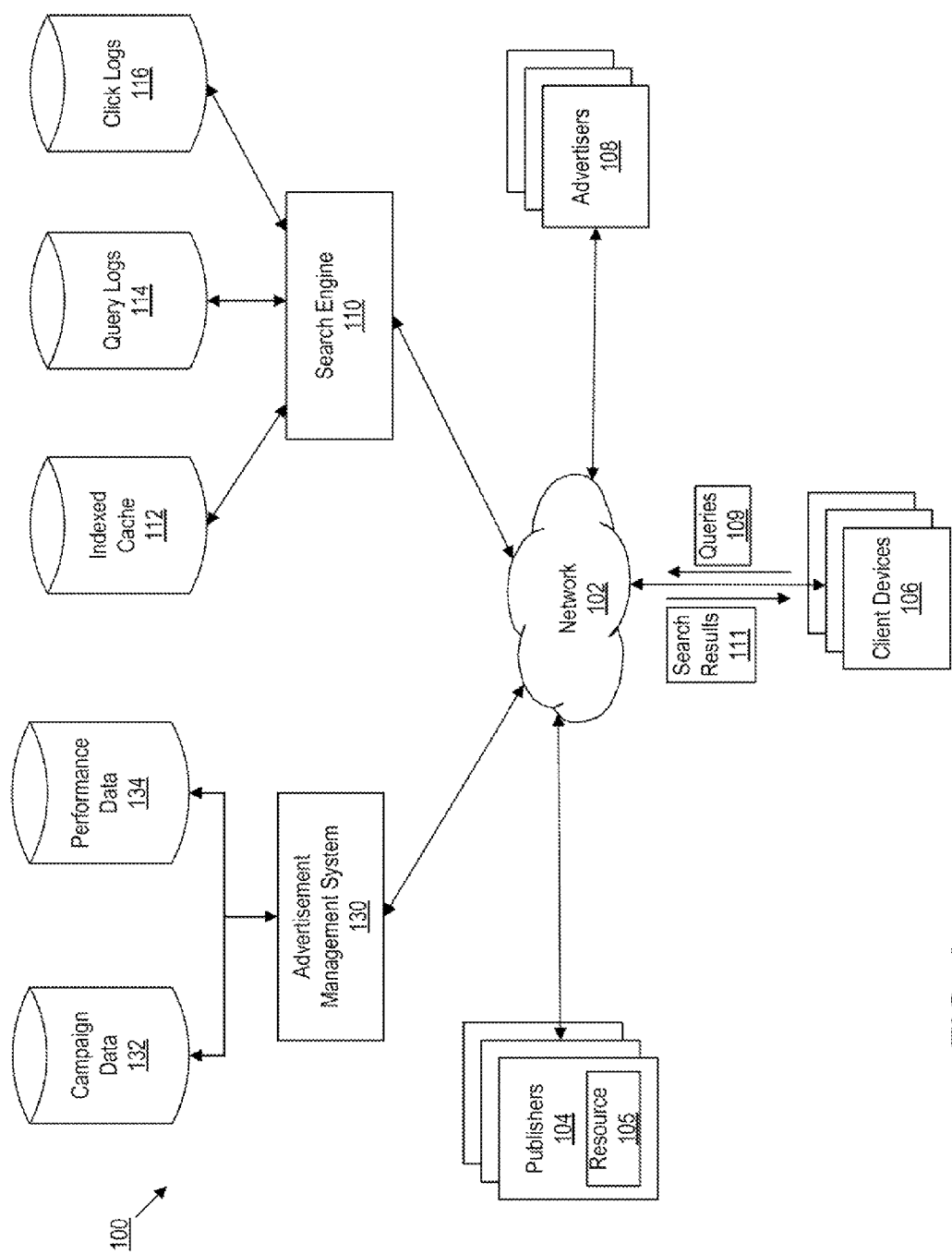
FIG. 1 is a diagram of an example environment that identifies advertising opportunities.

FIG. 1 is a block diagram of an example environment 100 that identifies advertising opportunities. The example environment 100 includes a search engine 110 that provides search services. A computer network 102, such as a local area network (LAN), wide area network (WAN), the Internet, or a combination thereof, connects publisher web sites 104, client devices 106, advertisers 108, search engine 110, and advertisement management system 130. The online environment 100 may include many thousands of publisher web sites 104, client devices 106, and advertisers 108.

A web site is one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site is maintained by a publisher, e.g., an entity that manages and/or owns the web site.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A client device 106 is an electronic device that is under the control of a user and is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the environment 100 can include a search engine 110 that identifies the resources by crawling the publisher web sites 104 and indexing the resources provided by the publisher web sites 104. Data about the resources can be indexed based on the resource to which the data corresponds. The indexed and, optionally, cached copies of the resources are stored in an indexed cache 112.

The client devices 106 submit search queries 109 to the search engine 110. The search queries 109 are submitted in the form of a search request that includes the search request and, optionally, a unique identifier that identifies the client device 106 that submits the request. The unique identifier can be data from a cookie stored at the client device, or a user account identifier if the user maintains an account with the search engine 110, or some other identifier that identifies the client device 106 or the user using the client device.

In response to the search request, the search engine 110 uses the indexed cache 112 to identify resources that are relevant to the queries. The search engine 110 identifies the resources in the form of search results 111 and returns the search results to the client devices 106 in search results pages. A search result is data generated by the search engine 110 that identifies a resource that satisfies a particular search query, and includes a resource locator for the resource. An example search result can include a web page title, a snippet of text extracted from the web page, and the URL of the web page. Search results pages can also include one or more advertisement slots in which advertisements can be presented.

When a resource 105 or search results 111 are requested by a client device 106, the advertisement management system 130 receives a request for advertisements to be provided with the resource 105 or search results 111. The request for advertisements can include characteristics of the advertisement slots that are defined for the requested resource or search results page, and can be provided to the advertisement management system 130.

For example, a reference (e.g., URL) to the resource for which the advertisement slot is defined, a size of the advertisement slot, and/or media types that are available for presentation in the advertisement slot can be provided to the advertisement management system 130. Similarly, keywords associated with a requested resource ("resource keywords") or a search query 109 for which search results are requested can also be provided to the advertisement management system 130 to facilitate identification of advertisements that are relevant to the resource or search query 109.

Based at least in part on data included in the request for advertisements, the advertisement management system 130 can select advertisements that are eligible to be provided in response to the request ("eligible advertisements"). For example, eligible advertisements can include advertisements having characteristics matching the characteristics of advertisement slots and that are identified as relevant to specified resource keywords or search queries 109. In some implementations, advertisements having targeting keywords that match the resource keywords or the search query 109 are selected as eligible advertisements by the advertisement management system 130.

A targeting keyword can match a resource keyword or a search query 109 by having the same textual content ("text") as the resource keyword or search query 109. For example, an advertisement associated with the targeting keyword "beaches" can be an eligible advertisement for an advertisement request including the resource keyword "beaches." Similarly, the advertisement can be selected as an eligible advertisement for an advertisement request including the search query "beaches."

The advertisement management system 130 can select from the eligible advertisements that are to be provided for presentation in advertisement slots of a resource or search results page based on results of an auction. For example, the advertisement management system 130 can receive bids from advertisers and allocate the advertisement slots, based at least in part on the received bids (e.g., based on the highest bidders at the conclusion of the auction). The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement. The selected advertisements can be determined based on the bids alone, or based on the bids of each bidder being multiplied by one or more factors, such as quality scores derived from advertisement performance, landing page scores, and/or other factors.

A conversion occurs when a user performs a particular action related to an advertisement provided with a resource or search results page. What constitutes a conversion may vary from case-to-case and can be determined in a variety of ways. For example, a conversion may occur when a user clicks on an advertisement, is referred to a web page, and consummates a purchase there before leaving that web page. A conversion can also be defined by an advertiser to be any measurable/observable user action, such as downloading a white paper, navigating to at least a given depth of a website, viewing at least a certain number of web pages, spending at least a predetermined amount of time on a website or web page, or registering on a website. Other actions that constitute a conversion can also be used.

The advertisement management system 130 facilitates the provisioning of advertisements with the resources 105. In particular, the advertisement management system 130 allows advertisers to define targeting rules that take into account attributes of the particular user to provide targeted advertisements for the users. Example targeting rules include keyword targeting, in which advertiser provide bids for keywords that are present in either search queries or web page content. Advertisements that are associated with keywords having bids that result in an advertisement slot being awarded in response to an auction are selected for displaying in the advertisement slots.

These targeted advertisements can be provided for many different resources, such as the resources 105 of the publishers 104, on a search results page, and with a resource that includes the search engine interface 120. For example, a resource 105 from the syndication publisher 104 includes instructions that cause the client device to request advertisements from the advertisement management system 130. The request includes a publisher identifier and, optionally, keyword identifiers related to the content of the resource. The advertisement management system 130, in turn, provides targeted advertisements to the particular user. When a user selects an advertisement, the client device 106 generates a request for a landing page of the advertisement, which is typically a web page of the advertiser. With respect to a search results page, the client device renders the search results page and sends a request to the advertisement management system 130, along with one or more keywords related to the query that the user provide to the search engine 110.

The advertisement management system 130 includes a data storage system that stores campaign data 132 and performance data 134. The campaign data 132 stores advertisements, targeting information, and budgeting information for advertisers. The performance data 134 stores data indicating the performance of the advertisements that are served. Such performance data can include, for example, click through rates for advertisements, the number of impressions for advertisements, and the number of conversions for advertisements. Other performance data can also be stored.

The campaign data 132 and the performance data 134 are used as input parameters to an advertisement auction, such as the auction referenced above. In particular, the advertisement management system 130, in response to each request for advertisements, conducts an auction to select advertisements that are provided in response to the request. The advertisements are ranked according to a score that, in some implementations, is proportional to a value based on an advertisement bid and one or more parameters specified in the performance data 134.

In some implementations, the queries 109 submitted from client devices 106 are stored in query logs 114. Click data for the queries and the web pages referenced by the search results are stored in click logs 116. The query logs 114 and the click logs 116 define search history data that include data from and related to previous search requests associated with unique identifiers. The click logs define actions taken responsive to search results provided by the search engine 110. The query logs 114 and click logs 116 can be used to map queries submitted by the client devices to web pages that were identified in search results and the actions taken by users (i.e., that data are associated with the identifiers from the search requests so that a search history for each identifier can be accessed). The click logs 116 and query logs 114 can thus be used by the search engine to determine the sequence of queries submitted by the client devices, the actions taken in response to the queries, and how often the queries are submitted.

For situations in which the systems discussed here collect personal information about users, the users may be provided with an opportunity to opt in/out of programs or features that may collect personal information (e.g., information about a user's preferences or a user's current location). User may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of a user cannot be determined.

Figure 2:
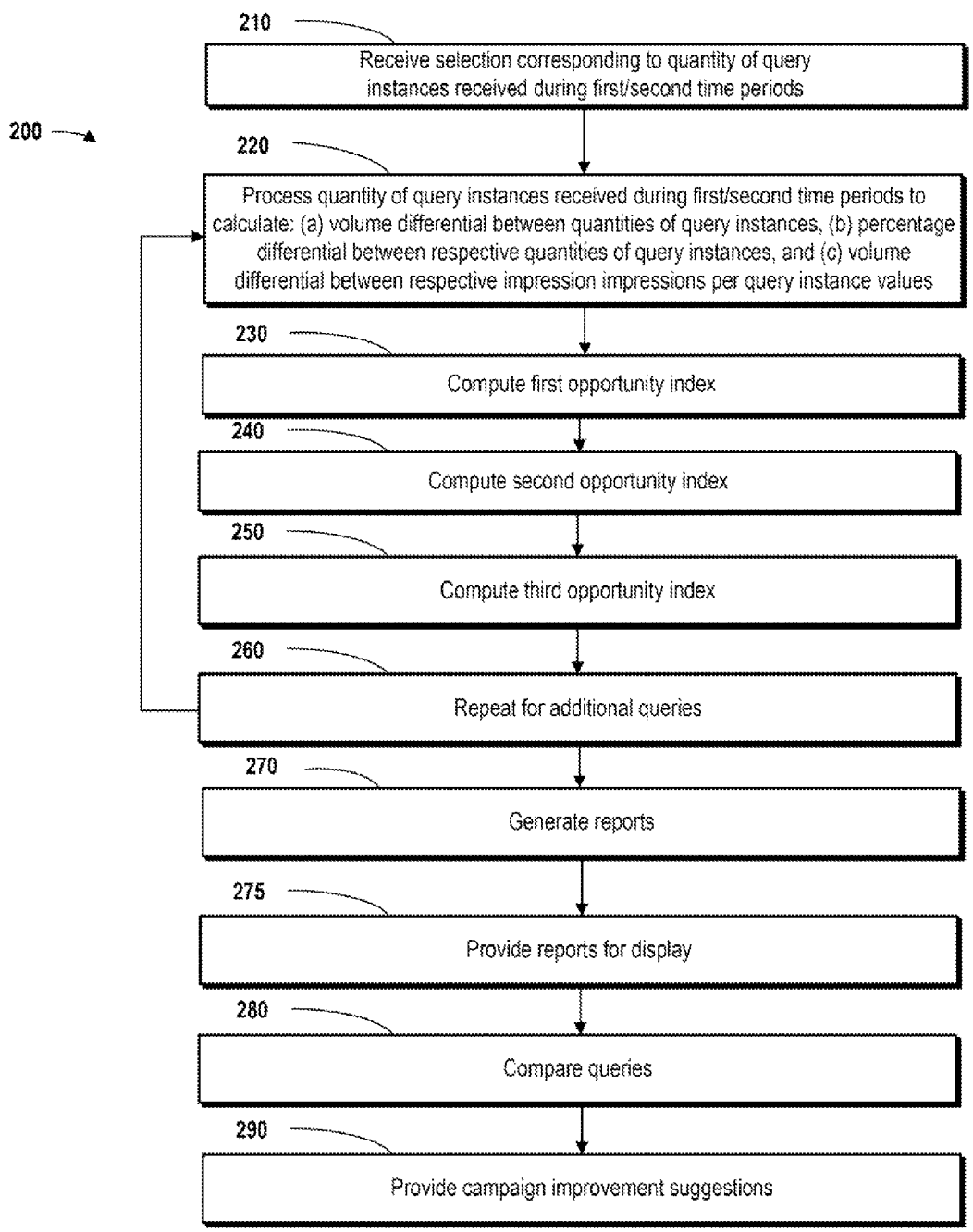
FIG. 2 is a flow chart of an example process for identifying advertising opportunities.

FIG. 2 is a flowchart of an example method 200 for identifying advertising opportunities. In some implementations, the method 200 can be performed by a processor executing instructions in a computer-readable storage medium. For example, the method 200 can be performed by advertisement management system 130 of FIG. 1.

A selection is received (210). In certain implementations, the selection corresponds to the quantity of query instances received during a first time period and/or the quantity of query instances received during a second time period. It should be understood that the term 'query instance' as used herein is intended to encompass an individual instance or occurrence of a particular query or search (e.g., a word, term, or phrase) being provided to a search engine. Accordingly a quantity of query instances received during a particular time period reflects the number of times that a particular query or search (or any number of different queries or searches) was provided to search engine 110 throughout the designated time span. In certain implementations, the various query instances and related values and metrics, such as those referenced herein, can be stored in and retrieved from query logs 114. As will be described herein, the various query instances and related values and metrics can provide insight to the advertiser regarding any number of aspects of the search performance (e.g., the top 100 rising queries) and/or advertising performance (e.g., the top 20 most commercialized queries) of the various queries processed by search engine 110.

Figure 3A:
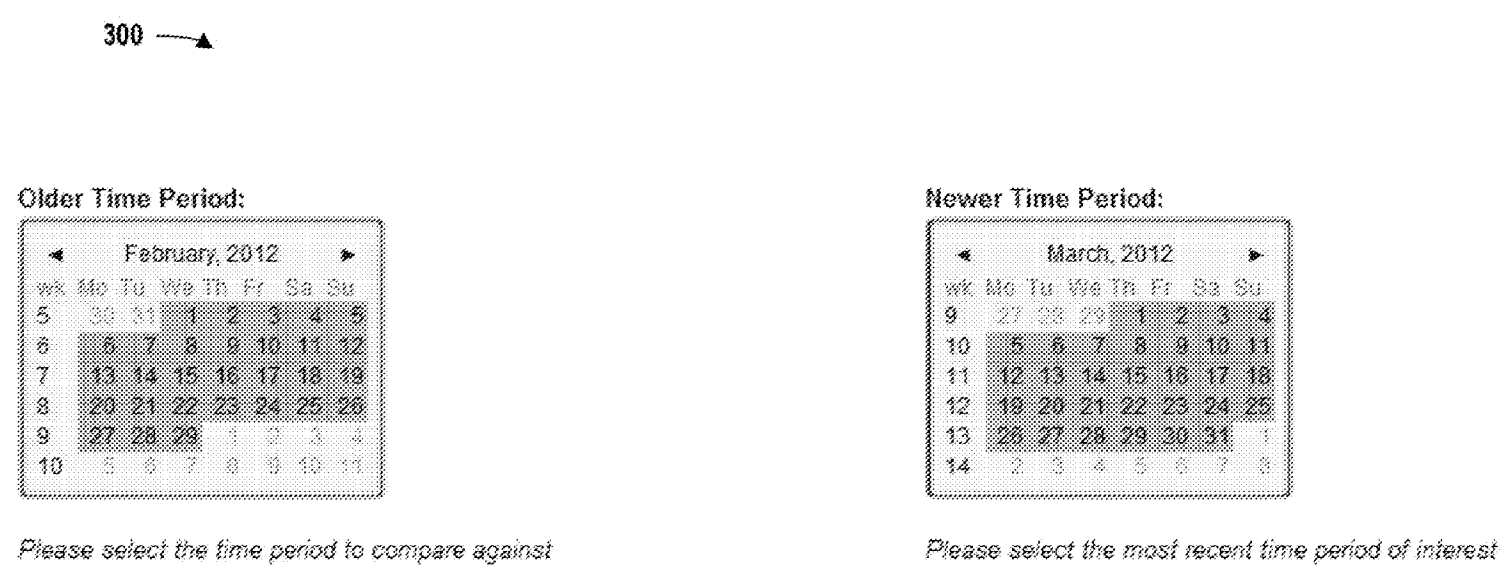

One or more selections can be provided by a user such as an advertiser wishing to review values and/or metrics regarding the various queries 109 processed by search engine 110 and stored in query logs 114. FIG. 3A depicts a screenshot of an exemplary user interface 300 (such as a portion or segment of a web page) whereby an advertiser can select a first time period ('Older Time Period' in FIG. 3A) and a second time period ('Newer Time Period'). Such selections can be provided by selecting or highlighting one or more dates on a calendar, such as the days of the months of February, 2012 and March, 2012, respectively, as shown in FIG. 3A. It should be understood that such first and second time period selections enable the various metrics and statistics from the respective time periods to be compared with one another (e.g., comparing various metrics measured in February for a particular query with those measured in March). In doing so, one or more changes and/or trends occurring between the first time period and the second time period can be determined. Accordingly, it can be appreciated that in certain implementations the first time period and the second time period have substantially similar durations (for example, the same number of days, the same number of calendar units—e.g., two calendar months, etc.), such that the various metrics being compared (e.g., the respective number of ad impressions during the first and second time periods) are substantially comparable to one another. Moreover, in the interest of identifying trends or shifts in various search and advertising behavior, in certain implementations the first and second time periods are chronologically consecutive to one another (e.g., February, 2012 and March, 2012).

It should also be understood that in certain implementations, the received selection can further correspond to query instances received from one or more geographic areas. For example, FIG. 3B depicts a screenshot of an exemplary user interface 310 whereby an advertiser can select one or more countries or regions. It can be appreciated that by selecting a particular country, the advertiser can further refine or focus the various query instances and related values and metrics received during the selected time periods to reflect only those queries originating from the selected geographic area (e.g., the United States, as shown in FIG. 3B).

Moreover, in certain implementations the received selection can further correspond to query instances associated with one or more categories. That is, it can be appreciated that any number of categories can be ascribed to a particular search query (e.g., a query of "basketball" can be associated with a 'sports' category). Accordingly, the received selection can further correspond to query instances that are associated with one or more categories. For example, FIG. 3C depicts a screenshot of an exemplary interface 320 whereby an advertiser can select one or more categories. It can be appreciated that by selecting a particular category, the advertiser can further refine or focus the various query instances and related values and metrics received during the selected time periods to reflect only those queries associated with a selected category (or categories). It should be noted, however, that refining a received selection by geography and/or category (as shown in FIGS. 3B and 3C) is merely exemplary, and any number of additional refinements are also possible. For example, the quantity of query instances received during the selected time periods can be further refined or focused to reflect only those queries originating at/associated with one or more device types (e.g., originating at mobile devices) and/or only those queries originating from users identified as belonging to a particular group and/or demographic (e.g., males between the ages of 18-25 with an interest in video games).

By way of further illustration, the selections depicted in FIGS. 3A-C result in selections that correspond to queries received during February, 2012 and March, 2012 (FIG. 3A) from the United States (FIG. 3B) within the 'MP3 Players' category. All of the queries satisfying each of these selections (or a subset thereof, such as the highest or lowest rated queries, based on any number of values and metrics) can be displayed to a user, as will be described herein.

A quantity of query instances received during a first time period and a quantity of query instances received during a second time period are processed (220). It should be understood that each of the query instances received during the first time period and the query instances received during the second time period correspond to a specific search query. For example, FIG. 4 depicts a screenshot of an exemplary interface 400 showing various metrics and values relating to several different queries ('smartphone,' 'MP3 player,' and 'tablet'). The column 'Old Count' refers to the quantity of query instances of a particular query that were received during the first time period (e.g., February, 2012, as shown in FIG. 3A), while the column 'New Count' refers to the quantity of query instances of a particular query that were received during the second time period (March, 2012). Thus, for example, it can be appreciated that 25 query instances of the query 'tablet' were received during the first time period, while 50870 query instances of the query 'tablet' were received during the second time period.

It should also be noted that in certain implementations each of the first and second quantities of query instances have respective impressions per query instance (IPQ) values. It should be understood that a number of 'impressions per query instance' reflects the average number of advertising impressions that are served by advertisement management system 130 in response to a particular query, such as on a search results page having multiple (e.g., 11) ad slots. It can be appreciated that a higher number of impressions per query instance reflects a query for which more advertising impressions are being served—indicating that this is a query that more advertisers are bidding on and wish to advertise for. For example, as shown in FIG. 4, with respect to the query 'smartphone' the number of 'impressions per query instance' during the first time period ('Old IPQ') was 0.04, while the number of 'impressions per query instance' during the second time period ('New IPQ') is 0.89. A volume differential between the respective impressions per query instance values can also be calculated ('Delta IPQ Growth' in FIG. 4). For example, the query 'smartphone' shows a 'Delta IPQ Growth' value of 0.85 (0.89−0.04).

In processing the query instances of a particular query (or queries), a volume differential between the respective quantities of query instances can be calculated. For example, and with reference to FIG. 4, the query 'MP3 Player' had a volume of 18 query instances during the first time period ('Old Count') and a volume of 61006 query instances during the second time period ('New Count'), reflecting a volume differential of 60988 queries from the first time period to the second time period ('Delta Query Growth'). In addition, a percentage differential between the respective quantities of query instances can be calculated ('Percent Query Growth'), such as 3388.22 for the query 'MP3 Player' (corresponding to 60988/18).

A first opportunity index is computed (230). In certain implementations, the first opportunity index ('Query Opportunity Index' in FIG. 4) constitutes the product of: (a) an absolute value of the volume differential between the respective quantities of query instances (that is, the absolute value of the 'Delta Query Growth' value), and (b) the percentage differential between the respective quantities of query instances (that is, the 'Percent Query Growth' value). For example, the query 'tablet' has a 'Query Opportunity Index' of 103408561 (50845×2033.8). It should be understood that the 'Query Opportunity Index' provides a measure of the degree of or rate at which a particular query is rising (or falling, in the case of a negative value) in popularity between the respective time periods. Moreover, comparing the 'Query Opportunity Index' value of two (or more) queries enables an advertiser to identify which query is rising (or falling) in popularity at a greater (or lesser) rate.

A second opportunity index is computed (240). In certain implementations, the second opportunity index ('Commercial Opportunity Index' in FIG. 4) constitutes the product of: (a) an absolute value of the first opportunity index (e.g., the 'Query Opportunity Index') (such as that computed at 230), (b) the volume differential between the respective impressions per query instance values ('Delta IPQ Growth' in FIG. 4), and (c) at least one of the impressions per query instance values (e.g., the 'New IPQ' value). Thus, for example, the query 'tablet' has a 'Commercial Opportunity Index' of approximately 3531185024.88 (approximately 103408561× 3.41×10.01). It can be appreciated that the 'Commercial Opportunity Index' provides a measure of the degree of or rate at which the commercial attributes of a particular query are rising (or falling) between the respective time periods, accounting for the number of advertisers bidding on queries that are also rising (or falling) quickly.

A third opportunity index is computed (250). In certain implementations, the third opportunity index ('IPQ Impact Index' in FIG. 4) constitutes the product of (a) the volume differential between the respective impressions per query instance values ('Delta IPQ Growth' in FIG. 4) and (b) at least one of the quantities of query instances (e.g., the 'New Count' value). Thus, for example, the query 'smartphone' has an 'IPQ Impact Index' of approximately 790487.2 (approximately 0.85×931432). It can be appreciated that the 'IPQ Impact Index' provides a measure of the degree of or rate at which a particular query is impacting an IPQ value of the category to which the particular query belongs (e.g., 'MP3 Players') between the respective time periods.

At this juncture, it should be understood that the illustrations of the various computations and operations described herein (e.g., the first, second, and third opportunity indexes) are intended for illustrative purposes. Accordingly, it should be further understood that any or all of the referenced computations and operations can be adjusted, modified, and/or supplemented, and any such adjustments, modifications, and/or supplements are also within the scope of the present specification.

Each of the referenced operations, including processing a quantity of query instances, computing a first opportunity index, computing a second opportunity index, and/or computing a third opportunity index, are repeated for each of a plurality of different search queries (260). That is, it can be appreciated that several of the metrics described herein can be further illustrative when compared with one another, such as by comparing the values associated with different queries. As such, certain operations (including but not limited to 220-250) can be repeated in order to generate such metrics for additional queries. Alternatively, multiple operations can be performed in parallel, in a manner known to those of ordinary skill in the art.

It should also be noted that while the various examples and illustrations provided herein generally refer to the various values and metrics with respect to individual search queries (e.g., 'smartphone,' 'tablet,' etc.), in certain implementations the same values and metrics can be provided with respect to one or more groups of search queries, such as ad groups, ad campaigns, ad categories, etc.

One or more reports are generated (270). For example, interface 400 in FIG. 4 reflects one such report. In certain implementations, such reports can reflect one or more values or metrics including but not limited to: (a) the quantity of query instances received during the first time period ('Old Count'), (b) the quantity of query instances received during the second time period ('New Count'), (c) the impressions per query instance value of the first time period (' Old IPQ'), (d) the impressions per query instance value of the second time period ('New IPQ'), (e) the volume differential between the respective quantities of query instances ('Delta Query Growth'), (f) the percentage differential between the respective quantities of query instances ('Percent Query Growth'), (g) the volume differential between the respective impressions per query instance values ('Percent IPQ Growth'), (h) a percentage differential between the respective impressions per query instance values ('Delta IPQ Growth'), (i) the first opportunity index ('Query Opportunity Index'), (j) the second opportunity index (' Commercial Opportunity Index'), and/or (k) the third opportunity index ('IPQ Impact Index') for one or more of the plurality of different search queries.

Reports are provided for display (285). For example, the reports generated at 280 can be provided to an advertiser for viewing via a web browser. It can be appreciated that an advertiser can sort the various queries based on any of the columns. For example, an advertiser interested in bidding on queries within the 'MP3 Players' category can sort the report by the 'Commercial Opportunity Index' value. As shown in FIG. 4, the query 'smartphone' has the highest 'Commercial Opportunity Index' value, indicating to the advertiser that this query is likely to be commercially advantageous to bid on.

At this juncture, it should be understood that while in many circumstances advertisers will wish to bid on queries having a high 'Commercial Opportunity Index' value (reflecting the fact that the query is being searched more frequently and is also being bid on by advertisers more frequently), in certain scenarios an advertiser can prefer low or negative values. For example, certain companies are premised upon selling items (e.g., old cellular phone models, used cars, etc.) after such items have already decreased in overall popularity and/or after such items have been replaced on the market by newer items. As such, it can be appreciated that it can be advantageous for such an advertiser to bid on a particular query when one or more values, such as the 'Commercial Opportunity Index,' are low or decreasing.

One or more of the different search queries are compared with one another (280). In certain implementations, such comparison can be performed based on at least one of: (a) the quantity of query instances received during the first time period (' Old Count'), (b) the quantity of query instances received during the second time period ('New Count'), (c) the impressions per query instance value of the first time period (' Old IPQ'), (d) the impressions per query instance value of the second time period ('New IPQ'), (e) the volume differential between the respective quantities of query instances ('Delta Query Growth'), (f) the percentage differential between the respective quantities of query instances ('Percent Query Growth'), (g) the volume differential between the respective impressions per query instance values ('Percent IPQ Growth'), (h) a percentage differential between the respective impressions per query instance values ('Delta IPQ Growth'), (i) the first opportunity index ('Query Opportunity Index'), (j) the second opportunity index ('Commercial Opportunity Index'), and/or (k) the third opportunity index ('IPQ Impact Index'), of the respective one or more of the different search queries. That is, as referenced above, various values and metrics associated with the various queries can be compared with one another in order to identify advantageous advertising opportunities and/or optimizations for the advertiser. For example, it can be appreciated with reference to FIG. 4 that a comparison of the respective 'Commercial Opportunity Index' values for the queries 'smartphone' and 'MP3 Player' indicates that 'smartphone' is associated with considerably more commerciality than 'MP3 Player,' owing largely to the fact that its quantity and percentage of impressions per query decreased dramatically between February, 2012 and March, 2012. Accordingly, an advertiser interested in bidding on the most popular queries within the 'MP3 Player' category would be better advised to bid on the query 'smartphone.'

Campaign improvement suggestions are provided to an advertiser (290). Such suggestions can be provided through any number of avenues, such as email (or other such electronic communication) and/or within the context of a user interface utilized by the advertiser to manage an advertising account. In certain implementations, such campaign improvement suggestions are provided based on the first opportunity index, the second opportunity index, and/or the third opportunity index. For example, FIG. 3D depicts an exemplary screenshot 330 of one such campaign improvement suggestion. As referenced above, it can be appreciated with reference to FIG. 4 that the 'Commercial Opportunity Index' values for the queries 'smartphone' and 'tablet' indicate that these queries both showed significant increases in the number of queries received and the number of ad impressions per query. Accordingly, these queries present opportunities for the advertiser to bid on queries that are popular with web searchers and also popular with potential competitors of the advertiser (as reflected by the increasing number of impressions per query).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 5:
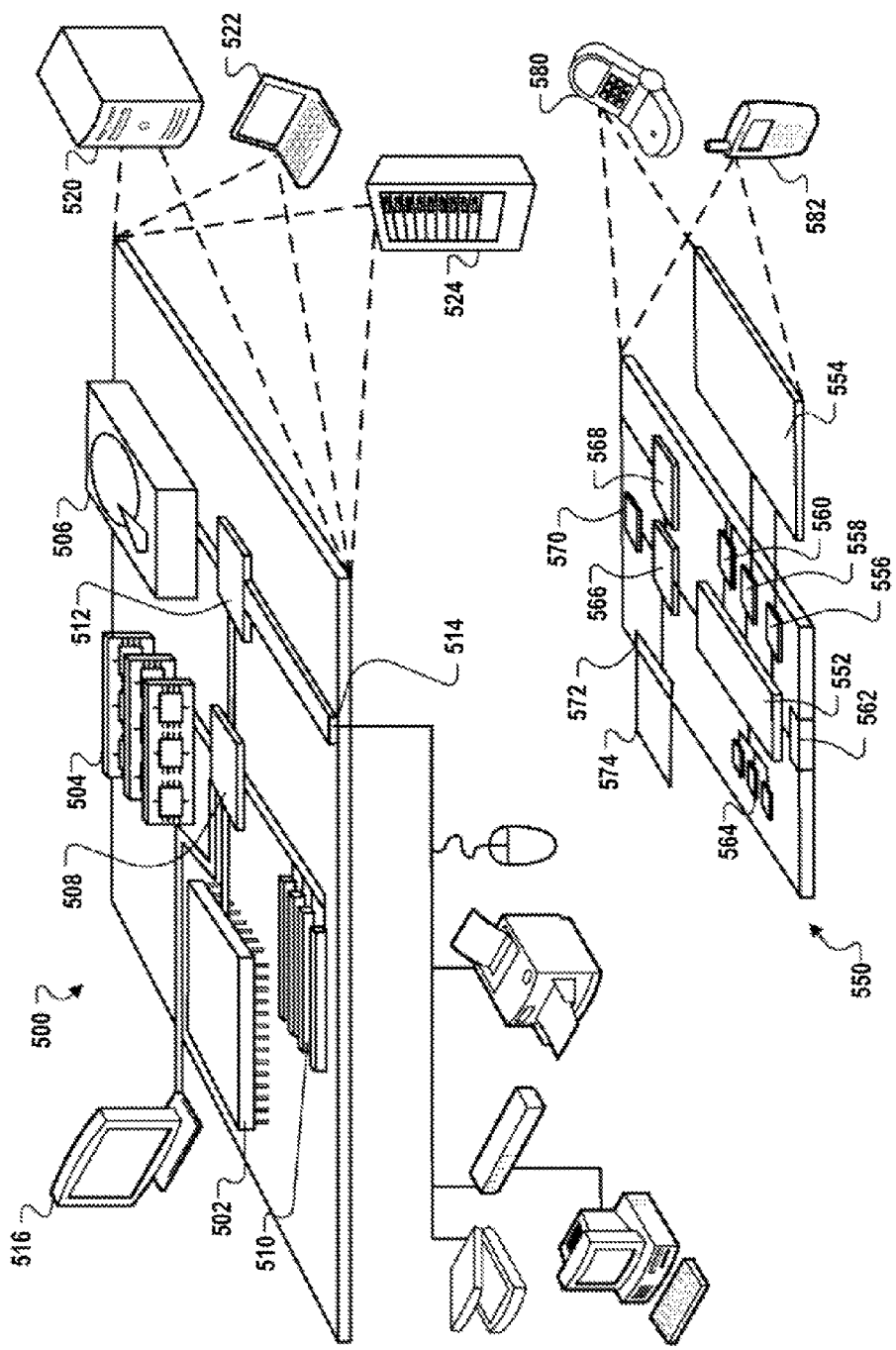
FIG. 5 shows an example of a computing device and a mobile computing device that can be used in connection with computer-implemented methods and systems described in the present specification.

FIG. 5 shows an example of a computing device 500 and a mobile computing device that can be used to implement the techniques described in the present specification. The computing device 500 is intended to represent various forms of digital computers, such as laptops, desktops, workstations, personal digital assistants, tablets, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a microdrive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provided as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for identifying advertising opportunities, the method comprising:
   processing a quantity of query instances received during a first time period and a quantity of query instances received during a second time period, each of the first and second quantities of query instances having a respective impressions per query instance value, to calculate (a) a volume differential between the respective quantities of query instances, (b) a percentage differential between the respective quantities of query instances, and (c) a volume differential between the respective impressions per query instance values, each of the query instances received during the first time period and the query instances received during the second time period corresponding to a specific search query;
   receiving a selection corresponding to at least one of (a) the quantity of query instances received during a first time period and (b) the quantity of query instances received during a second time period;
   computing, with a processor executing code, a first opportunity index, the first opportunity index comprising a product of:
      (a) an absolute value of the volume differential between the respective quantities of query instances, and
      (b) the percentage differential between the respective quantities of query instances;
   computing a second opportunity index, the second opportunity index comprising a product of:
      (a) an absolute value of the first opportunity index,
      (b) the volume differential between the respective impressions per query instance values, and
      (c) at least one of the impressions per query instance values;
   providing one or more campaign improvement suggestions to an advertiser based on the second opportunity index;
   generating one or more reports reflecting at least one of:
      (a) the quantity of query instances received during the first time period, (b) the quantity of query instances received during the second time period, (c) the impressions per query instance value of the first time period, (d) the impressions per query instance value of the second time period, (e) the volume differential between the respective quantities of query instances, (f) the percentage differential between the respective quantities of query instances, (q) the volume differential between the respective impressions per query instance values, (h) a percentage differential between the respective impressions per query instance values, (i) the first opportunity index, and (i) the second opportunity index, for one or more of the plurality of different search queries; and providing the reports for display.

2. The method of claim 1, further comprising computing a third opportunity index, the third opportunity index comprising the product of (a) the volume differential between the respective impressions per query instance values and (b) at least one of the quantities of query instances.

3. The method of claim 2, wherein the providing step further comprises providing one or more campaign improvement suggestions to an advertiser based on the third opportunity index.

4. The method of claim 1, wherein the selection comprises one or more geographic areas.

5. The method of claim 1, wherein the selection comprises one or more categories.

6. The method of claim 1, wherein the selection comprises one or more device types.

7. The method of claim 1, wherein the first time period and the second time period have substantially similar durations.

8. The method of claim 1, further comprising repeating each of the processing, computing a first opportunity index, and computing a second opportunity index steps for each of a plurality of different search queries.

9. The method of claim 8, further comprising:

comparing one or more of the different search queries with one another based on at least one of:

(a) the quantity of query instances received during the first time period, (b) the quantity of query instances received during the second time period, (c) the impressions per query instance value of the first time period, (d) the impressions per query instance value of the second time period, (e) the volume differential between the respective quantities of query instances, (f) the percentage differential between the respective quantities of query instances, (g) the volume differential between the respective impressions per query instance values, (h) a percentage differential between the respective impressions per query instance values, (i) the first opportunity index, and (j) the second opportunity index, of the respective one or more of the different search queries.

10. A system comprising: one or more processors configured to interact with a computer-readable medium in order to perform operations comprising:

processing a quantity of query instances received during a first time period and a quantity of query instances received during a second time period, each of the first and second quantities of query instances having a respective impressions per query instance value, to calculate (a) a volume differential between the respective quantities of query instances, (b) a percentage differential between the respective quantities of query instances, and (c) a volume differential between the respective impressions per query instance values, each of the query instances received during the first time period and the query instances received during the second time period corresponding to a specific search query;

receiving a selection corresponding to at least one of (a) the quantity of query instances received during a first time period and (b) the quantity of query instances received during a second time period;

computing a first opportunity index, the first opportunity index comprising a product of:

(a) an absolute value of the volume differential between the respective quantities of query instances, and (b) the percentage differential between the respective quantities of query instances;

computing a second opportunity index, the second opportunity index comprising a product of:

(a) an absolute value of the first opportunity index, (b) the volume differential between the respective impressions per query instance values, and (c) at least one of the impressions per query instance values;

providing one or more campaign improvement suggestions to an advertiser based on the second opportunity index;

generating one or more reports reflecting at least one of:

(a) the quantity of query instances received during the first time period, (b) the quantity of query instances received during the second time period, (c) the impressions per query instance value of the first time period, (d) the impressions per query instance value of the second time period, (e) the volume differential between the respective quantities of query instances, (f) the percentage differential between the respective quantities of query instances, (g) the volume differential between the respective impressions per query instance values, (h) a percentage differential between the respective impressions per query instance values, (i) the first opportunity index, and (j) the second opportunity index, for one or more of the plurality of different search queries; and providing the reports for display.

11. The system of claim 10, further configured to perform operations comprising: computing a third opportunity index, the third opportunity index comprising the product of (a) the volume differential between the respective impressions per query instance values and (b) at least one of the quantities of query instances.

12. The system of claim 11, wherein the providing operation further comprises providing one or more campaign improvement suggestions to an advertiser based on the third opportunity index.

13. The system of claim 10, wherein the selection comprises one or more geographic areas.

14. The system of claim 10, wherein the selection comprises one or more categories.

15. The system of claim 10, wherein the selection comprises one or more device types.

16. The system of claim 10, wherein the first time period and the second time period have substantially similar durations.

17. The system of claim 10, further configured to perform operations comprising: repeating each of the processing, computing a first opportunity index, and computing a second opportunity index operations for each of a plurality of different search queries.

18. The system of claim 17, further configured to perform operations comprising:

comparing one or more of the different search queries with one another based on at least one of:

(a) the quantity of query instances received during the first time period, (b) the quantity of query instances received during the second time period, (c) the impressions per query instance value of the first time period, (d) the impressions per query instance value of the second time period, (e) the volume differential between the respective quantities of query instances, (f) the percentage differential between the respective quantities of query instances, (g) the volume differential between the respective impressions per query instance values, (h) a percentage differential between the respective impressions per query instance values, (i) the first opportunity index, and (j) the second opportunity index, of the respective one or more of the different search queries.

19. A non-transitory computer storage medium encoded with a computer program, the program comprising instructions that when executed by a data processing apparatus cause the data processing apparatus to perform operations comprising:

receiving a selection corresponding to at least one of (a) the quantity of query instances received during a first time period and (b) the quantity of query instances received during a second time period, the first time period and the second time period having substantially similar durations;

processing a quantity of query instances received during a first time period and a quantity of query instances received during a second time period, each of the first and second quantities of query instances having a respective impressions per query instance value, to calculate (a) a volume differential between the respective quantities of query instances, (b) a percentage differential between the respective quantities of query instances, and (c) a volume differential between the respective impressions per query instance values, each of the query instances received during the first time period and the query instances received during the second time period corresponding to a specific search query;

computing a first opportunity index, the first opportunity index comprising a product of:
 (a) an absolute value of the volume differential between the respective quantities of query instances, and
 (b) the percentage differential between the respective quantities of query instances;

computing a second opportunity index, the second opportunity index comprising a product of:
 (a) an absolute value of the first opportunity index,
 (b) the volume differential between the respective impressions per query instance values, and
 (c) at least one of the impressions per query instance values;

generating one or more reports reflecting at least one of:
(a) the quantity of query instances received during the first time period, (b) the quantity of query instances received during the second time period, (c) the impressions per query instance value of the first time period, (d) the impressions per query instance value of the second time period, (e) the volume differential between the respective quantities of query instances, (f) the percentage differential between the respective quantities of query instances, (g) the volume differential between the respective impressions per query instance values, (h) a percentage differential between the respective impressions per query instance values, (i) the first opportunity index, and (j) the second opportunity index, for one or more of the plurality of different search queries;

providing the reports for display; and providing one or more campaign improvement suggestions to an advertiser based on the second opportunity index.

* * * * *